United States Patent [19]

Abela et al.

[11] Patent Number: 5,036,463
[45] Date of Patent: Jul. 30, 1991

[54] ANGIOSCOPIC SYSTEM AND METHOD FOR DIMENSIONAL MEASUREMENT INCLUDING MEASUREMENT OF THE DISTANCE FROM ANGIOSCOPIC ENDS TO DESIGNATED PLANES

[75] Inventors: George S. Abela; Stephan E. Friedl, both of Gainesville, Fla.

[73] Assignee: University of Florida, Gainesville, Fla.

[21] Appl. No.: 275,754

[22] Filed: Nov. 23, 1988

[51] Int. Cl.$^5$ .............................................. G06F 15/42
[52] U.S. Cl. .................................. 364/413.13; 382/2; 382/6
[58] Field of Search .......................... 358/98, 88, 107; 356/384, 383; 382/216; 364/360, 413.13

[56] References Cited

U.S. PATENT DOCUMENTS

| 4,175,545 | 11/1979 | Termanini. | |
|---|---|---|---|
| 4,331,132 | 5/1982 | Mukasa | 358/88 |
| 4,638,798 | 1/1987 | Shelden et al.. | |
| 4,651,201 | 3/1987 | Schoolman | 358/88 |
| 4,669,467 | 6/1987 | Willett et al.. | |
| 4,718,417 | 1/1988 | Kittrell et al.. | |
| 4,722,337 | 2/1988 | Losch et al.. | |
| 4,770,653 | 9/1988 | Shturman | 604/96 |
| 4,809,066 | 2/1989 | Leberl et al. | 364/560 |
| 4,830,460 | 5/1989 | Goldenberg | 350/96.26 |
| 4,949,296 | 8/1990 | Malinowski | 364/752 |

Primary Examiner—Gail O. Hayes
Attorney, Agent, or Firm—Kerkam, Stowell, Kondracki & Clarke

[57] ABSTRACT

An angioscopic system includes image processing so as to determine the dimensions of an unknown dimensional feature within the field of view of the angioscope. The system is calibrated by placing a series of known images at known separation distances from the tip of the angioscope and measuring the size of the image which is produced upon a video monitor. This provides a series of data indicating the relationship between the actual size of the feature, the apparent size in pixels on the image, and the known separation distance from the tip of the scope to the feature plane in which the dimensional feature is disposed. Collection of this data allows one to generate, by curve fitting techniques, a functional relationship such that the size of an unknown dimensional feature may be determined when the angioscope is used upon an actual patient. The coefficients generated by the calibration technique are stored in the computer and called up during the measurement process which involves viewing a scene from several different points and using a Newton-Jordan or other minimization technique in order to generate the actual area or other dimensional aspect of the feature of interest. A modified system uses a stereoscopic angioscope in order to provide depth information with respect to an image without the necessity of moving an angioscope tip. A calibrated guidewire may be used to orient and stabilize the tip of the scope. Markings on the guidewire allow one to determine the amount of change in position of the tip.

26 Claims, 10 Drawing Sheets

| for r = 0.5mm | |
|---|---|
| Z(mm) | norm. P(PIXELS/mm) |
| 2.0 | 85.709 |
| 2.5 | 66.498 |
| 3.0 | 56.833 |
| 3.5 | 47.290 |
| 4.0 | 40.898 |
| 4.5 | 36.215 |
| 5.0 | 32.357 |
| 5.5 | 29.550 |
| 6.0 | 26.778 |
| 6.5 | 24.770 |
| 7.0 | 23.036 |

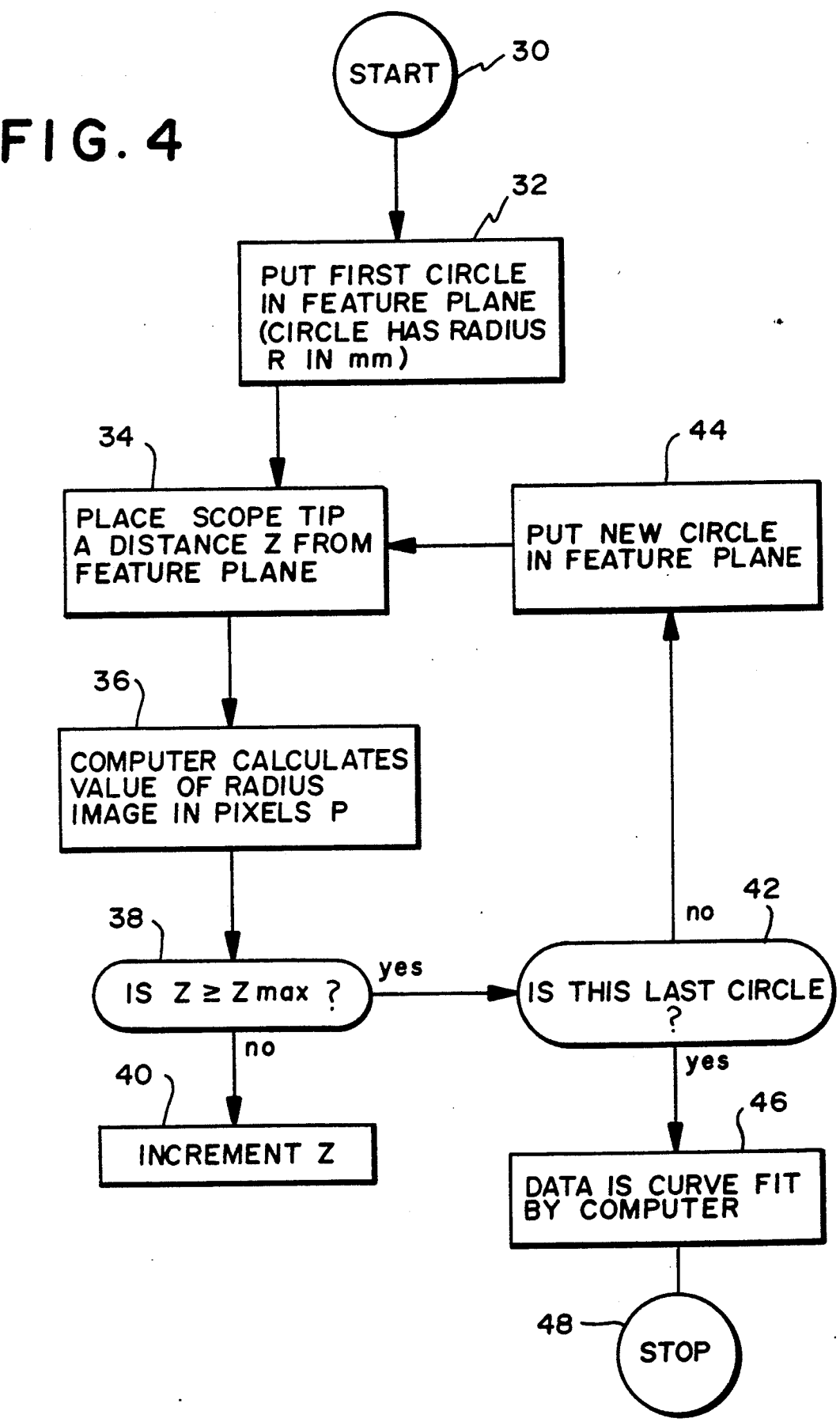

$$Z = \lambda - \frac{\lambda B}{(X_1 - X_2)}$$

Where:

Z — Z WORLD COORDINATE OF POINT W

B — BASELINE DISTANCE BETWEEN FIBER BUNDLES $X_1$ — X COORDINATE IN IMAGE PLANE 1

$X_2$ — X COORDINATE IN IMAGE PLANE 2

$\lambda$ — FOCAL LENGTH OF FIBER BUNDLE

ALL QUANTITIES WITH THE EXCEPTION OF Z ARE KNOWN OR MAY BE DETERMINED.

ANGIOSCOPIC SYSTEM AND METHOD FOR DIMENSIONAL MEASUREMENT INCLUDING MEASUREMENT OF THE DISTANCE FROM ANGIOSCOPIC ENDS TO DESIGNATED PLANES

BACKGROUND OF THE INVENTION

This invention relates to quantification of dimensional features appearing in an angioscope. More specifically, this invention relates to an angioscopic dimensional analysis system for determining the actual size of any feature within an angioscope image. Additionally, this invention relates to a method of calibrating an angioscopic dimensional analysis system and a method of using such a system.

Angioscopes have been used for viewing various features within the cardiovascular system of a patient. The angioscope is a fiber optic instrument which is inserted into the patient. Generally, a light source is provided to illuminate the part of the patient just beyond the tip of the fiber optic cable and a camera may be attached to the end of the fiber optic cable which is remote from the tip. The camera provides an image to a CRT such that a doctor may view the inside of the patient.

Although prior angioscopic systems have been useful, they have generally been unable to provide accurate information about the size of various features. For example, if a patient has a partial blockage in an artery, prior angioscopic systems have been unable to provide the doctor with accurate information as to the size of the blockage.

OBJECTS AND SUMMARY OF THE INVENTION

Accordingly, it is a primary object of the present invention to provide an angioscopic system which is useful for relatively accurately and simply providing accurate measurements of the dimensions of features within an angioscopic image.

A further object of the present invention is to provide a simple and accurate technique for calibrating such an angioscopic dimensional analysis system.

Yet another object of the present invention is to provide a method of using an angioscopic dimensional analysis system in order to determine the dimensions of a feature within an angioscopic image.

The above and other objects of the present invention, which will become more apparent as the description proceeds, are realized by a system for angioscopic dimensional analysis including an angioscope having a tip. A video camera is connected to the angioscope. A monitor displays images from the angioscope. A computer is connected to process data from the video camera. The computer has stored coefficients for conversion of pixels into dimensional units for feature planes at different distances from the tip. The computer is operable to determine dimensional features within the angioscopic image by use of the following method. The computer receives data representative of the number of pixels corresponding to an unknown dimensional feature of an angioscopic image with the tip positioned at a plurality of distances from a feature plane. Next, the computer determines the distance from the tip to the feature plane based upon changes in the data corresponding to moving the position of the tip a known amount. The computer quantifies the dimensional feature by use of at least one appropriate coefficient to convert from pixels to dimensional units. The determination of the distance from the tip to the feature plane is performed by converting the unknown dimensional feature from pixels into dimensional units $A1$ when the feature plane is at a first unknown distance from the tip based upon a hypothesized distance from the feature plane to the tip, converting the unknown dimensional feature from pixels int dimensional units $A2$ when the feature plane is at a second unknown distance from the tip based upon a second hypothesized distance from the feature plane to the tip, the second unknown distance being a known offset from the first unknown distance, and trying different values for the first and second hypothesized distances to yield different values for $A1$ and $A2$ by repetitive conversions until $A1$ and $A2$ are determined to be sufficiently close that the hypothesized distances are accurate such that the dimensional feature is quantified from the final values of $A1$ and/or $A2$. A more sophisticated version of the present invention includes the conversion of the unknown dimensional feature from pixels into dimensional units $A3$ when the feature plane is at a third unknown distance from the tip based upon a third hypothesized distance from the feature plane to the tip, the third unknown distance being a known offset from the first unknown distance and/or a known offset from the second unknown distance and trying different values for the first, second, and third hypothesized distances to yield different values for $A1$, $A2$, and $A3$ by repetitive conversions until $A1$, $A2$, and $A3$ are determined to be sufficiently close that the hypothesized distances are accurate such that the dimensional feature is quantified from $A1$, $A2$, and/or $A3$. The invention further includes the selection of accurate hypothesized distances by determining the hypothesized distances which provide the minimal differences in values for $A1$, $A2$, and $A3$.

The present invention includes a method for use with the angioscopic dimensional analysis system having the steps comprising calibrating the system by placing at least one known pattern at a series of known distances from the tip of the angioscope such that the video camera generates a corresponding series of images composed of pixels. The number of pixels in a dimensional feature of the pattern having known dimensions for each image is then measured. The computer then calculates at least one coefficient for each known distance, each coefficient useful for conversion of pixels to dimensional units. Each of the coefficients is then stored. The placing step includes the placing of several known patterns at a series of known distances. Each of the images is preferably a circle. The calculation of the coefficients includes curve fitting to determine the relationship between the known dimensions, the pixels in dimensional features, and the known distances.

The measurement technique which relies upon moving the tip of the scope a known amount would, of course, require a technique for determining that amount. The present invention includes a technique for determining (i.e., making "known") the unknown amount of change in position of the tip of the angioscope. Specifically, the technique involves the use of a guidewire which extends beyond the tip of the angioscope and has indicia or markings separated by known distances. By moving the tip of the angioscope and considering the change in apparent distance between two of the indicia or markings, one can readily determine the amount of distance which the tip of the angioscope has been moved. Accordingly, the change in position of the tip of the angioscope is then a known amount which can be used in conjunction with the above techniques for measuring an image of an unknown dimensions. The guidewire, to which the tip of the angioscope is coupled, is also used to stabilize the angioscope and to orient the angioscope such that the field of view of the angioscope is better than would otherwise be the case.

The present invention also includes the technique of calculating the dimensional feature in an image from an angioscope where the distance from the tip of the angioscope to the feature is known. This somewhat simpler technique would involve converting the dimensional feature from pixels into dimensional units based upon knowledge of the relationship between the apparent size of a feature and its actual size, this relationship having been stored in the computer by storage of the various coefficients discussed in more detail above.

The present invention further includes an angioscope having two image-guiding fiber optic bundles spaced apart to provide a stereoscopic image. This arrangement uses stored coefficients for conversion of pixels into dimensional units as with the monoscopic version. However, the distance from the tip of the angioscope to the feature is determined by a comparison between the separate images produced by the different bundles. This stereoscopic angioscope may be used in conjunction with the angioscopic system including a video camera, a monitor, and computer in somewhat similar fashion to the monoscopic angioscope.

The invention further includes a method of obtaining an image from a vessel in a patient by an angioscope. The steps include: inserting a guidewire having an end into the vessel; inserting the angioscope into the vessel with the angioscope having a tip which is coupled to the guidewire; and maintaining the tip of the angioscope spaced from the end of the guidewire such that the angioscope is oriented to provide a desired image. That is, the image of the angioscope will provide a better view of the vessel. The guidewire includes indicia separated by a known distance.

BRIEF DESCRIPTION OF THE DRAWINGS

The above and other features of the present invention will be more readily understood when the following detailed description is considered in conjunction with the accompanying drawings wherein like characters represent like parts throughout the several views, and in which:

FIG. 3A shows a table of data generated by the calibration technique of FIGS. 2A and 2B, whereas FIG. 3B shows a curve corresponding to the data;

FIG. 4 shows a simplified flow chart of the calibration method according to the present invention;

FIG. 5A shows a simplified side view illustrating the measurements process according to the present invention, whereas FIG. 5B shows the corresponding image on the angioscope;

FIG. 6A shows a simplified side view of an alternate measurement position to that of FIG. 5A, whereas FIG. 6B shows the angioscopic image corresponding to the position of FIG. 6A;

DETAILED DESCRIPTION

Figure 1:
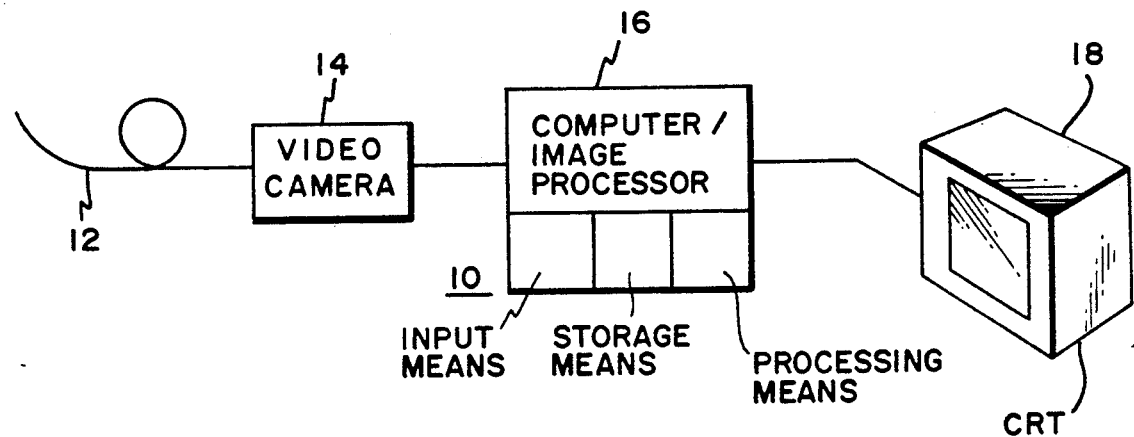
FIG. 1 shows a simplified perspective view of the present system.

The system 10 according to the present invention is illustrated in simplified form in FIG. 1 and includes an angioscope 12, a video camera 14 connected to the angioscope 12 in known fashion to supply an output signal corresponding to the image as viewed by the angioscope 12. The signal supplied by the video camera 14 is sent to a computer/image processor 16 and a video monitor 18. In addition to displaying the image from the angioscope 12, the monitor 18 allows one to use a cursor (not shown) in combination with the computer 16 in order to input data to the computer 16. Although this feature need not be described in detail, it should briefly be noted that the use of a cursor in connection with a video/computer system is well known and simply allows one to input data to the computer corresponding to points of interest on the image appearing on the video monitor. As shown in FIG. 1, the computer 16 may be considered as including an input means, a storage means, and a processing means.

The present invention is applicable to any angioscope/image processing combination. The choice of actual components for the system 10 would be governed largely by portability constraints. The present measurement technique imposes few limitations on such a system. Without limiting the application of the present invention, it may be noted that an American Edwards Laboratory 0.84 millimeter fiber optic angioscope, Pulnix solid-state color video camera, and IBM PC-AT with numeric coprocessor and Imaging Technology FG-100AT image processing card may be used to realize the system of FIG. 1 together with a video monitor.

The video camera 14 is connected to the image processing card in the computer 16. The image processing card will digitize video frames from the camera and store this video information in the computer's memory as a two-dimensional set of pixels contained in a closed region (i.e., a region corresponding to an area enclosed by a line whose start and end points are identical), each capable of representing any one of 4096 colors or grey levels. Each pixel in the image contains one small portion of the entire angioscope picture. This effectively allows the angioscope image to be broken into a set of individual points which can be analyzed by the computer. Furthermore, if the magnification of the system is known, then the number of pixels between two points in the scope image or the number of pixels contained in a closed region may be directly related to the distance between the two points or the area of the region.

The two-dimensional array of pixels which is stored in the computer's memory by the operation of the image processing card together with the computer in known fashion can be accessed by the computer in several ways. However, the image processing card generally stores the information in a cartesian coordinate system. Therefore, access to this data must likewise use a cartesian coordinate system. Although cartesian coordinates are fine for many applications, their use tends to complicate the expression of systems which exhibit circular symmetry about a central axis. As angioscopes exhibit this type of symmetry, the computer 16 may be programed in known fashion to map the cartesian coordinates into polar coordinates with the central axis of the polar system passing through the center of the scope image corresponding to the center of the angioscope.

It should briefly be noted that most optical fiber angioscopes are composed of several thousands of individual fibers fused into one larger bundle. The arrangement transmits an image from one end of the optical fiber to the other. The image produced at the observer's end of the optical fiberscope is distorted with respect to many parameters. This distortion tends to be non-linear, and the amount of distortion varies from scope to scope. It is the non-linearity of this distortion which allows absolute measurements to be made using the present system.

At the outset, it may be useful to note two assumptions which are made in the description of the present invention which follows. It should be noted that these assumptions allow for a simplified realization of the present invention, but the assumptions may be compensated for. Moreover, the assumptions may, at most, limit the accuracy of the present system, which is still believed to be very useful in providing a doctor with information which has heretofore not been conveniently available. The assumptions are as follows:

1. The variation of pixel distance from the scope center to any point on a concentric ring about the scope center may be neglected. In other words, the radial distance for a perfect circle centered at the scope center is independent of the angle.
2. All features to be measured lie on a single plane perpendicular to the scope tip. In other words, only flat features may be measured, these features being considered part of the plane which is known as the "feature plane".

Calibration

Figure 2A:
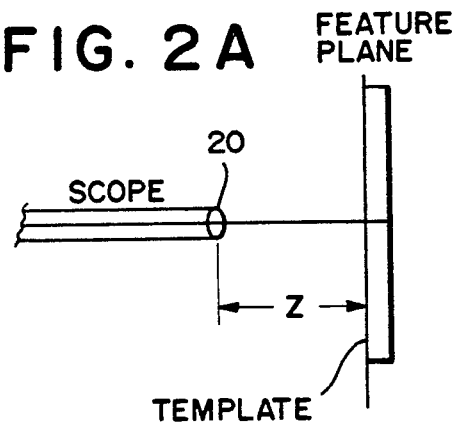
FIG. 2A shows a side view of a calibrate,. arrangement used corresponding image sensed by the angioscope

Calibration of the system 10 is achieved by measuring the radii of a variety of circles at various distances from the scope tip, and then calculating a set of coefficients for the scope equation which best fits this data. The calibration circles must be centered in the angioscopic field of view at every sample distance. Known techniques may be used to ensure that the calibration circles ar centered in the angioscopic field of view at every sample distance. A circle center dot might be lined up with the center of the scope as a way of centering the calibration circles. The basic calibration arrangement has the scope tip 20 placed a distance Z from a template as shown in FIG. 2A. The scope tip 20 is perpendicular to the feature plane corresponding to the front face of the template. The template has a circle 22 centered about the origin corresponding to the Center of the scope image 24. It will be appreciated that the circle 22 is not visible on FIG. 2A because FIG. 2A is a side view of the generally planer template.

It should be noted that the range of circle radii and distances from the feature plane are determined by the angioscope and the application. The smallest calibration circle and the largest Z-Axis distance should be determined by the application. The size of the smallest circle should be equivalent to the size of the smallest object which one might wish to measure, or alternatively, which one could measure. The largest Z-Axis distance should be determined as the greatest distance over which one might expect to view an object.

Alternatively, the shortest Z-Axis distance should be chosen as that distance at which the smallest calibration circle completely fills the angioscope image. Additionally, the largest circle should be chosen as that circle which will just fill the angioscope image when the angioscope is at the greatest Z-Axis distance.

In general, the data points might extend for a number of different circles having radii from 0.5 millimeters to 5.0 millimeters and being separated by distances Z over an operational range of 2.0 millimeters to 14.0 millimeters. The more data which is used during the calibration process, the more accurate the calibration will be such that the measurement may likewise be more accurate.

Figure 2B:
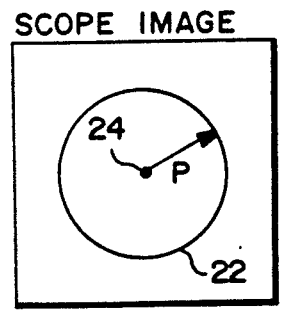
FIG. 2C shows a partial scope image to depict an area calculation technique.
Figures 3A, 3B:
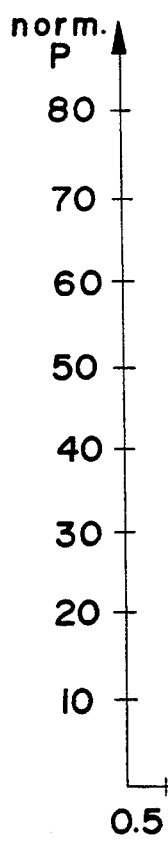

The circle 22 has a known actual radius of 0.5 millimeters, and the data for the particular template having the circle of that radius for a particular angioscope might correspond to FIG. 3A. This figure shows the distance of separation between the feature plane and the scope tip 20 and the resulting apparent radius of the image of circle 22 appearing in FIG. 2B. As shown in the table of FIG. 3A, the pixels appearing in the radius of the image are related to the actual radius of the circle on the template by a differing amount depending on the separation distance Z between the scope tip 20 and the feature plane. The normalized P of FIG. 3A is simply the pixel radius P divided by the actual radius (in millimeters), but either the pixel radius or the normalized radius could be stored. With reference to FIG. 3B, which has the data of FIG. 3A graphed, it will be apparent that the number of pixels in the image for each millimeter of actual radius is exponentially related to the separation distance Z between the scope tip and the feature plane.

The relationship between the radius of the image in pixels P and the separation distance Z and the actual radius in millimeters may be stated as follows:

$$R = F(Z) \cdot exp\ (H(P)) \quad (1)$$

where R is the actual radius of the ring in millimeters,
F(Z) is a function of the separation distance Z between the scope tip and the feature plane, and
H(P) is a function of the image radius P of the ring in pixels.

The present invention may use any of various known curve fitting techniques in order to determine the characteristics of the functions F and H. It will be appreciated that during the calibration phase, one knows the values for R, Z, and P, but does not know the characteristics of the functions F and H. By providing the computer with sufficient calibration data, one can readily determine sufficient characteristics of the functions F and H such that knowledge of the separation distance Z and the "pixel size" of a dimensional feature will allow one to apply the above equation in order to solve for the actual radius or other dimensional feature of an unknown dimensional feature in an angioscopic image from a patient.

The characteristics of the equations F and H are known to the extent that one may determine the functional form of the equations. The curve-fitting method takes the calibration data and determines the best set of coefficients for the equation whose functional form is already known. Curve-fitting does not produce an equation from nothing, but rather produces a set of coefficients for an equation whose form has been pre-determined.

Although other functions might be used in order to best curve fit the above equation, the following functions have provided relatively good results:

$$F(Z) = A \cdot Z \quad (2)$$

$$H(P) = B \cdot P + C \cdot P^2 + D \cdot P^3 + E \cdot P^4 \quad (3)$$

where A, B, C, D, and E are coefficients which are determined based upon the input calibration data corresponding to various templates having circles of different radii and using different values for Z as discussed above. (The dots indicate multiplication.)

The unknown coefficients may be calculated by use of GaussJordan elimination based curve fitting, although other methods of curve fitting could be used as well. Correlation coefficients on the order of 0.99 have been obtained using the present technique and the above equation. It should be noted that the exponential appears to represent the actual magnification characteristics of the fiber optic angioscope quite accurately.

As shown by the simplified flow chart of FIG. 4, the calibration process is started at block 30 and includes a first step of putting a first circle in the feature plane at block 32. As shown in FIG. 2A, the circle may be disposed on a template or sheet. At block 34, the scope tip 20 is placed a distance Z from the feature plane. At block 36, the computer calculates the value of the radius of the image in pixels P, this radius being illustrated in FIG. 2B.

Figure 2C:
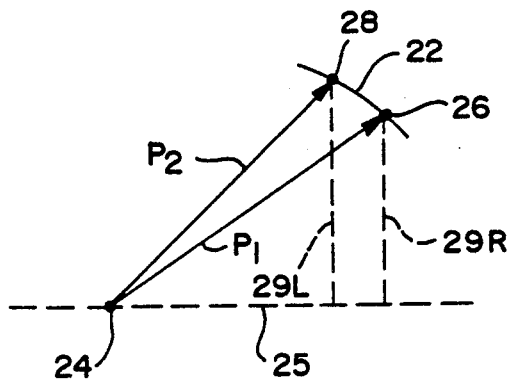

The computer may calculate the value of the radius P using any of several techniques. A preferred embodiment calculates the radius P for the fifty radii having each of fifty equally spaced angles extending throughout the circle 22. In order to minimize the effect of slight non-uniformities in the circle 22 or small offsets between the center of the circle and the center of the scope tip 20, the fifty initial values for P may be used to derive a single value for P corresponding to the given radius in millimeters R of the actual circle and the given distance Z. A preferred technique calculates the area in pixels of the circle and then divides the area by $\pi$ (pi) and takes the square root of the result. The area could be calculated in any of numerous ways but an illustrative example is shown in FIG. 2C where a small section of the circle 22 is shown together with two radial lines P1 and P2. The computer may calculate where the two radial lines intersect the circle 22 at points 26 and 28 by known techniques for detecting for discontinuity. In other words, points 26 and 28 correspond to very dark pixels surrounded by relatively light pixels. The computer may detect the inner edge of circle 22 and the outer edge of the circle and take the average between the two points in order to generate point 26 for radial line P1 and take the average of two similar points along radial line P2 in order to determine point 28. Having located points 26 and 28, the area between circle 22 and horizontal line 25 may be calculated by figuring the area within the trapezoid bounded by horizontal lines 29L and 29R. By determining the area of a sufficient number of trapezoids (which area is simply the area of the rectangle together with the area of the triangle within the trapezoid), one can readily calculate the overall area of the circle 22. This overall area is then divided by $\pi$ (pi) and the square root of the result is used to provide a relatively accurate value for the radius in pixels P.

As an alternative to the above technique for determining the radius P, one could simply take a large number, for example 50, of radial lines around the circle 22 and determine the average length of the radial lines.

The computer may test the validity of each point on the circumference by ensuring that the contrast or difference between the dark pixel on the ring and the adjacent pixel exceed a threshold. If the threshold is not exceeded, the computer may attempt to detect the edge of the circle on a radial line whose angle is slightly greater than the previous attempt. If several (5) attempts fail, then that small section ($\pi/25$) Radians in angular measure, may be disregarded.

Following the calculation of the radius P in pixels, Z is tested to determine if it has reached or exceeded a maximum value for Z at block 38. If the maximum value of Z has not been reached, Z is incremented at block 40 (i.e., the person doing the calibrating simply moves the scope tip 20 or the circle in order to increase the separation distance Z between them). Following the increase in the separation distance, the computer calculates a new value of radius P at block 36 corresponding to the same known value of radius R in millimeters and the new value of Z.

When the test at block 38 indicates that the maximum value of Z has been reached, the computer will have a value P for each Z for a circle of given radius R. The test at block 38 then leads to block 42 which questions whether the last circle has been tested. If not, a new circle is placed in the feature plane as indicated at block 44. The person doing the calibrating may simply change to a different sheet or template having a circle of different radius.

For a particular size circle the starting location (i.e., value of Z) should be such that the circle is just barely contained within the scope's field of view. The ending location (highest value of Z) should be such that the circle is just barely measurable by the edge detection code, this corresponding to a pixel radius of approximately 12 pixels for a particular version of the invention which was made by the inventors.

When the decision block 42 indicates that the last circle has been tested, the computer can curve fit the data at block 46 by using Gauss-Jordan elimination based curve fitting or some other process. The data which is used for the curve fitting in block 46 may be in the form indicated in FIG. 3A for each of the different sized circles. However, the pixel measurement is normalized (i.e., divided by the radius) in the data form of FIG. 3A and one could alternately store and curve fit data based on the actual image radii (pixels instead of pixels per millimeter). In any case, block 46 provides the functions F and H. If those functions are taken to be in the form indicated above, the computer will calculate at block 46 values for the coefficients A, B, C, D, and E.

Following block 46, the calibration process is complete and the computer has stored values for the coefficients.

It should be noted that the simplified example of FIG. 4 relies upon a person to manually perform most of the steps except blocks 36 and 46. In other words, the manual operator will input the known value for the radius R and the known value for the separation distance Z and will manually change the separation distance Z and provide a new circle at the appropriate time. It will be readily appreciated that the process of FIG. 4 could be automated with robotic or other sophisticated control systems used to perform each of the steps in the calibration process.

Measurement

Once the scope has been adequately described by a set of calibration coefficients, measurements may be made.

The basic principles of measuring an unknown dimensional feature in a feature plane may be discussed with reference to FIGS. 5A, 5B, 6A, and 6B. Assume that one wishes to know the area in millimeters of a dimensional feature corresponding to image 50 in FIG. 5B, one can easily determine the distance between and edge of the curve 50 and the center 24 of the scope image. The feature 50 may correspond to a blockage in a patient's artery and the operator would trace this feature by use of a cursor in known fashion.

Figures 5A, 5B:
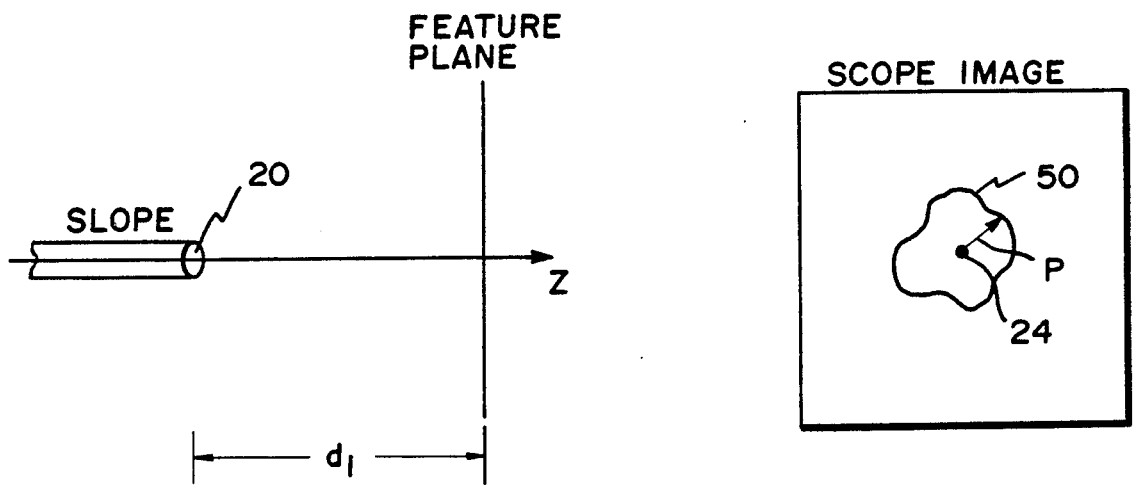
Figures 6A, 6B:
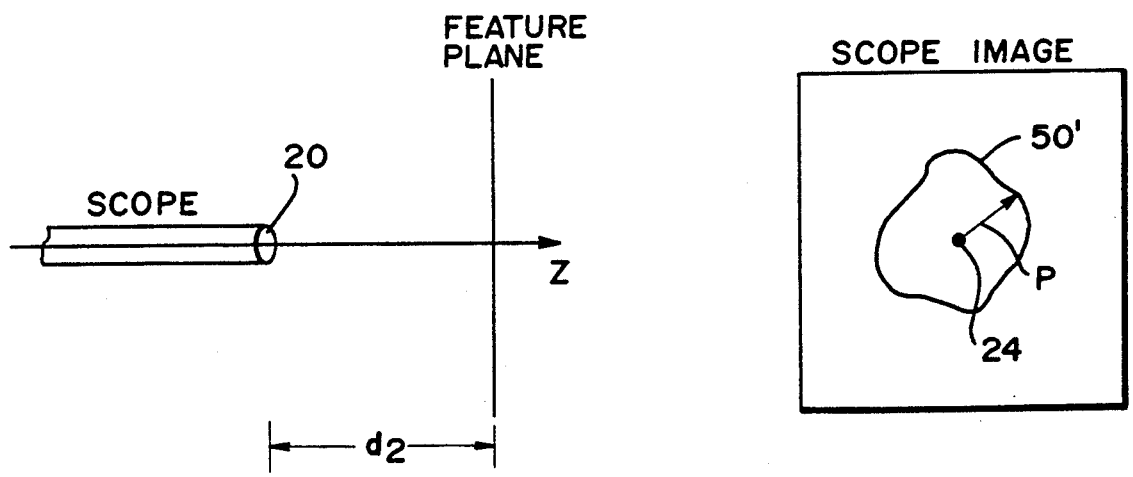

Although one does not know the separation distance D1 between the scope tip 20 and the feature plane in FIG. 5A, one can move the scope tip 20 towards the feature plane to provide a separation distance D2 in FIG. 6B. Although the separation distance D2 is unknown again, the scope tip 20 will have been moved a known amount. (The change in position of the scope tip can be determined by moving the external portion of the angioscope a set amount and assuming that the tip inside the patient's vessel was moved the same amount, but this may introduce errors into the measurement. A more precise technique to determine the change in position uses a guidewire as discussed in more detail below.) For example, one might move the scope tip 20 one-half (0.5) millimeters such that D1 is equal to D2+0.5 millimeters. In the position of FIG. 6B, the operator would then trace by cursor the new exterior outline 50' of the image in order to determine what the actual distances D1 and D2 are such that the area of the unknown dimensional feature corresponding to images 50 and 50' may be calculated. The computer may be programmed to iterate different values for D1. For example, the computer might initially assume that D1 is 8.0 millimeters. A series of pixel radii P are then converted from pixels into millimeters based upon this assumption. The computer calculates the area within curve 50 by a process such as that discussed above with respect to FIG. 2C. It should be noted that the image 50 of the dimensional feature in question need not enclose the center of the scope 24 as the area of non-uniform shapes outside the center 24 may easily be calculated by known techniques similar to that shown in FIG. 2C. As the curve 50 of FIG. 5B is not uniform like the circle in the calibration situation of FIG. 2B, a sufficient number of radii P should be used to ensure accurate calculation. This may be accomplished by taking each point on the curve, but every other point has been sufficient in practice.

Having calculated a presumed area A1 in square millimeters for the feature corresponding to image 50 based upon the assumption that distance D1 is 8 square millimeters, one would then calculate in similar fashion the area A2 in square millimeters for the feature corresponding to image 50' of FIG. 6B based upon the assumption that distance D2 is equal to 8 square millimeters minus 0.5 square millimeters or 7.5 square millimeters. If the areas turn out to be unequal as would be expected initially, one knows that the assumed value for D1 (and hence the assumed value for D2) is incorrect. (An optional validity test would make sure that the area in pixels within 50' is greater than the area in pixels within 50 as any other result would indicate that the operator did not properly trace the feature.) It should be noted that in converting the pixel radii P from pixels into millimeters, one is of course using the equation relating R to a function of P and Z and calling from storage the values for the coefficients A, B, C, D, and E.

As the first assumed value for D1 did not indicate that the distance was correct, the computer would automatically try other values for D1 until the areas in square millimeters for the calculations corresponding to image 50 and the calculations corresponding to image 50' were equal or the difference in areas are below a given threshold (either absolute or percentage of the areas). At that stage, the computer would have selected the correct distances D1 and the area in millimeters for that feature would have already been calculated or could easily be calculated by, for example, taking the average of the two slightly different areas.

The above process for measurement relies upon moving the scope tip 20 a known offset in order to calculate the actual area or other dimensional aspect of an unknown dimensional feature lying in the feature plane. In order to minimize error which might arise from noise or inaccuracies in the operator's tracing of the curve 50 or 50', a more complicated three step approach using essentially the same principles as the above two step approach is recommended.

Figure 7:
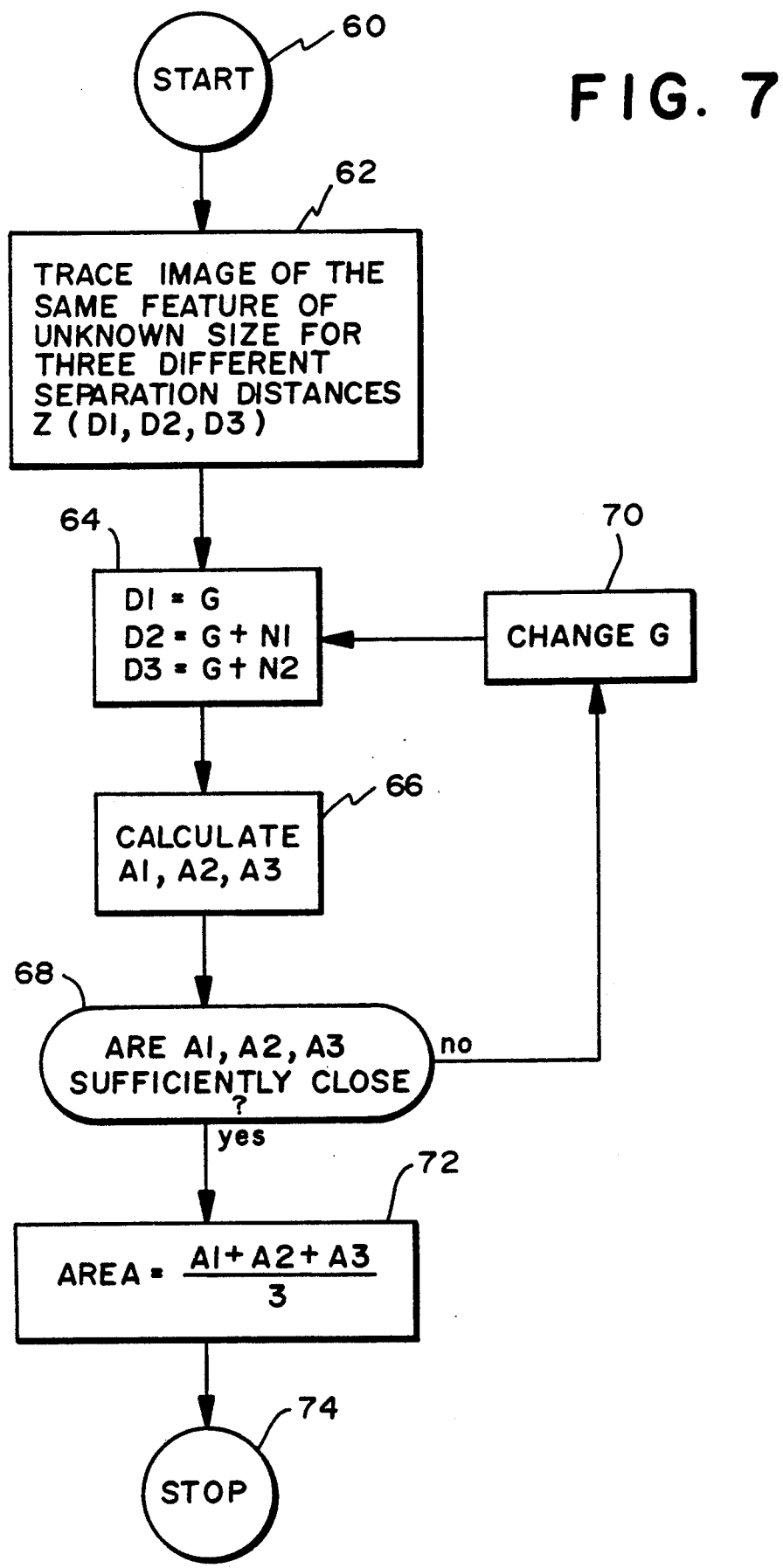
FIG. 7 shows a simplified flow chart for the measurement process of the present invention.

A simplified flow chart illustrates the three step process in FIG. 7. Following the start at block 60, the operator would trace the perimeter of the image of the same feature of unknown size for three different separation distances Z corresponding to D1, D2, and D3. Although one does not know the values for D1, D2, and D3 one does know the offsets between D1, D2, and D3 as distance D2 is realized by moving the angioscope a known distance from D1 and likewise, distance D3 is realized by moving the tip of the angioscope a known offset from the previous position. In other words, the angioscope is inside the patient and the perimeter of the first image is traced, then the scope tip is moved a set amount and the perimeter of the second image is traced. The scope tip is moved an additional known offset and the perimeter of a third image is traced.

It may be useful at this stage to note that the shape of the feature which is being measured should be the same in each of the three scope images. If the shape of the dimensional feature changes from one image to another, this will indicate to the operator that the feature of interest does not lie in a feature plane perpendicular to the tip of the angioscope and the measurement will be of questionable accuracy for such a feature. In other words, this provides a built-in test to minimize any inaccuracies arising from the feature lying outside of the feature plane (i.e., the feature of interest is not in a plane perpendicular to the scope).

As indicated at block 64, the computer will initially provide a guess G for the distance D1. The distance D2 would then be assumed to be offset from the guess G by a known amount N1. In similar fashion, the distance D3 would be assumed to be offset from the guess by a known offset amount N2. Block 66 then calculates three areas corresponding to the assumed distances. These areas would be calculated by initially converting points along the exterior of the image into pixel polar coordinates and converting the pixel polar coordinates to millimeter polar coordinates. These millimeter polar coordinates are then converted back into cartesian coordinates, but now in millimeter measure. Area calculations would be performed such that the results A1, A2, and A3 would respectively correspond to the values in millimeters of the area of the dimensional feature of interest. The conversion of the points along the tracing of the dimensional feature would be accomplished by reference to the equation relating R, P, and Z and based upon the previously calculated calibration coefficients A, B, C, D, and E. If the areas are not sufficiently close, decision block 68 transfers control to block 70 whereupon the computer calculates a new guess G and returns control to block 64. The areas A1, A2, A3 are recalculated until the block 68 indicates that the areas are sufficiently close that an accurate result has been obtained. At that stage, the block 72 calculates AREA as the average of the three areas and block 74 indicates that the measurement process is complete. The computer 16 (refer back momentarily to FIG. 1) may output the actual area so that the doctor may know the size of the blockage in the artery or the other feature of interest.

The simplified flow chart of FIG. 7 may be implemented in a number of ways. However, the known Newton-Raphson technique may be used in order to bring the three areas sufficiently close. Under that known technique, the block 70 of FIG. 7 would change G in an appropriate direction in order to bring the difference in the areas to a minimum value. The known technique, discussed in more detail below, would provide a minimum value for the difference indicated by the equation below:

$$\text{DIFFERENCE} = (A1-A2)^2 + (A1-A3)^2 + (A2-A3)^2 \quad (4)$$

As with the two step process, an optional validity testing technique may be used to ensure that an area in pixels does not change in a manner inconsistent with the change in separation distance. For example, if an image gets larger when one has moved away from it, the operator has improperly traced the curve or some other error has occurred.

The dimensional angioscopic system and techniques discussed herein are capable of providing the most accurate in-vivo measurements of lumen diameter yet obtained. As it views the lumen directly, it can handle irregular lumen cross-sections much more easily than techniques using angiograms. Additionally, other features encountered during an angioscopic examination may be readily measured including features which may not be measurable by any other technique.

It will be readily appreciated that one might determine the dimensions of a feature in the angioscopic image very quickly if one knows the distance between the tip of the angioscope and the feature of interest. Under such conditions, one would not need to outline the perimeter of the feature with the tip at various positions. If one knows the distance from the tip of the scope to the feature in question, the dimensional feature need only be outlined and the computer may be informed of the distance from the scope tip to the object. The area would then be directly computed and one need not move the tip to three different locations. An example of this type of measurement would involve having a calibrated guidewire in the angioscope's image, and directly reading the distance from tip to object in much the same fashion as one would read a ruler. Alternately, one might advance the angioscope until its tip touches the object to be measured, and then pull back the angioscope a known distance. The use of a calibrated guidewire (i.e., a guidewire having indicia separated by known distances marked thereon) is discussed in more detail below.

Stereoscopic Angioscopic System

Figure 8:
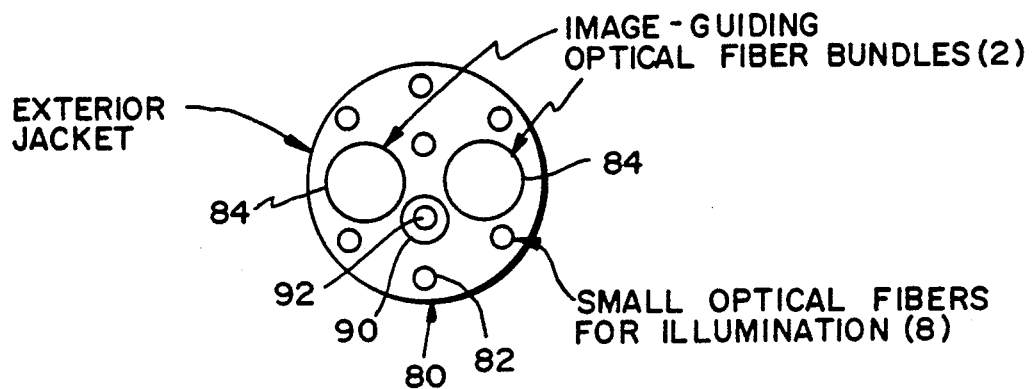
FIG. 8 shows a simplified end view of a stereoscopic angioscope.
Figure 9:
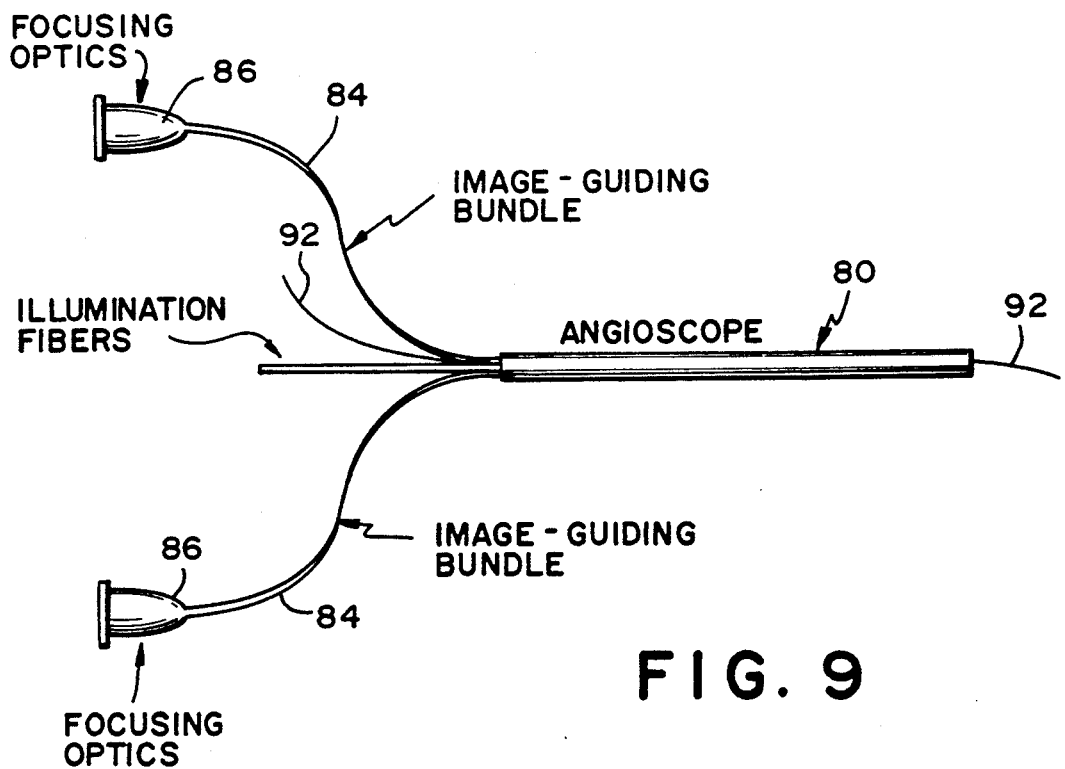
FIG. 9 shows a simplified side view of the angioscope of FIG. 8.

With reference to FIGS. 8 and 9, a stereoscopic angioscope 80 is shown as including two image guiding optical fiber bundles 84 which are separated by an offset distance. Eight small optical fibers for illumination 82 are included in the angioscope 80. As shown in the view of FIG. 9, each of the image fiber bundles 84 has focusing optics 86 connected to an end of the fiber bundles 84 remote from the end which is inserted in the patient. A guidewire hole 90 (FIG. 8 only) may receive a guidewire 92 in order to stabilize the angioscope and orient the angioscope in a fashion discussed in more detail below. Each of the focusing optics arrangements 86 may be connected to a separate video camera, both of which are connected to a common computer and video monitor in similar fashion to the arrangement of FIG. 1. Alternately, a single video camera could be connected to selectively receive the image corresponding to each of the two bundles 84. As will be appreciated from FIGS. 8 and 9, the stereoscopic angioscope 80 is essentially two separate angioscopes packaged in the same unit.

In much the same fashion as stereoscopic cameras which were in vogue at the turn of the century, the angioscope 80 would provide two images of the same scene, from observation points separated by a known distance.

The main motivation for the stereoscopic design to provide the capacity to directly extract depth information about objects within the scene. The human visual system does this automatically, but rather qualitatively, indicating the relationship of objects to the foreground, background and each other, but generally not providing exact distances from viewer to object. Digital computers now allow one to analyze stereoscopic images and directly determine distances from viewing system to object and the size of the objects themselves. Computer vision specialists have been working on stereoscopic vision systems for several years.

The stereoscopic angioscope 80 provides two distinct improvements to the monoscopic system. First, video monitors or CRT systems are now available which are adapted to display stereoscopic images. Using a computer to collect images from both image-guiding fiber bundles 84 simultaneously, and to format these images for display by a stereoscopic CRT would allow physicians to directly peer into a scene in much the same way as an audience at a 3-D movie. This would allow the manipulation of instruments under this type of guidance and would provide for exact knowledge of where the instrument is in relation to the rest of the scene. A second advantage is that the computer may analyze the stereoscopic scenes such that absolute dimensional measurements of objects within the scene could be made from only one stereoscopic image. In other words, it would not be necessary to move the scope tip in the manner discussed above with respect to the monoscopic system. By identifying the location of some object within both images, the distance from viewing system to object may be determined from the difference in the location of the object in both pictures and the distance between two observation points (i.e., the two fiber optic bundles). In addition to avoiding the necessity of taking three separate pictures of the same object at different locations as required by the monoscopic system, the stereoscopic system would not require that the object to be analyzed lie in a viewing plane perpendicular to the angioscope tip. These requirements are unnecessary in a stereoscopic system because each point on the perimeter of the object to be analyzed may be directly located in three dimensional cartesian coordinates. Therefore, objects which are not flat with respect to the angioscopic tip could be accurately mapped into a three dimensional space.

The stereoscopic angioscope 80 would have each of the bundles 84 separately calibrated in the same fashion as with the monoscopic system. However, the extraction of depth information would be obtained in a much different fashion. Two approaches may be used to determine scene depth.

Figure 10:
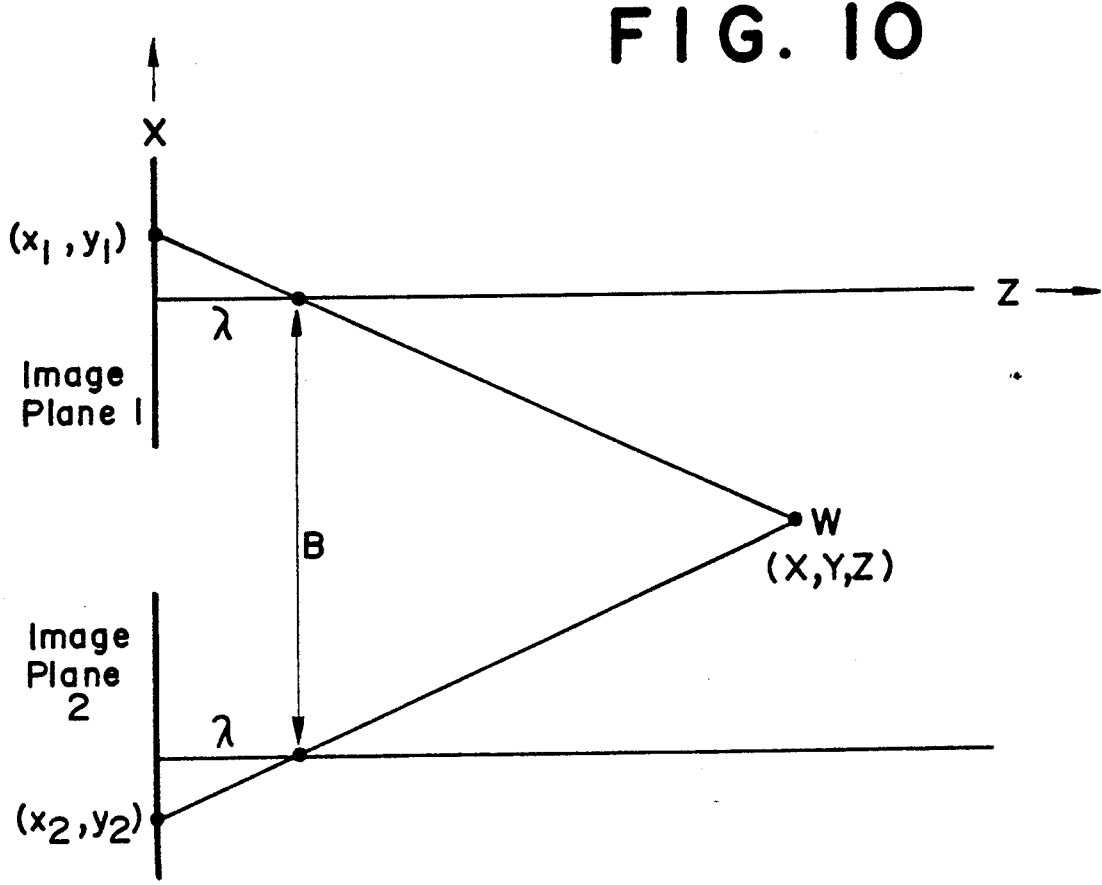
FIG. 10 shows a schematic to illustrate the principles of stereovision as used with the arrangement of FIGS. 8 and 9 and illustrates the technique for quantification of objects within the field of view of a stereoscopic angioscope.

A first approach to determine the depth of the scene is a classical technique which utilizes geometry to resolve the depth. This approach is shown in FIG. 10 and will be understood as being similar to the technique of finding a source of radio transmission by using a direction-finding receiver to draw lines from different reception areas indicating the direction where the radio signal comes from. This common technique then locates the source of radio transmission at the intersection between the two lines. The principle of operation of FIG. 10 is essentially similar.

A second technique in order to obtain depth information would be to add a depth calibration technique to the system. Depth calibration would mix location information from both scopes to determine a depth relationship for both scopes. Such a technique would involve three separate sets of calibration equations. Each of the separate scopes of image/guiding bundles 84 would have a set of calibration equations from the calibration technique discussed above with respect to the monoscopic system. A third set of calibration equations would allow one to determine the distance from scope tip to object based upon the difference in location of the same point in both images. Although this is somewhat more complicated than the first approach to developing depth information, it would be the easiest and potentially most reliable approach for practical use.

Guidewire Technique

Figure 11:
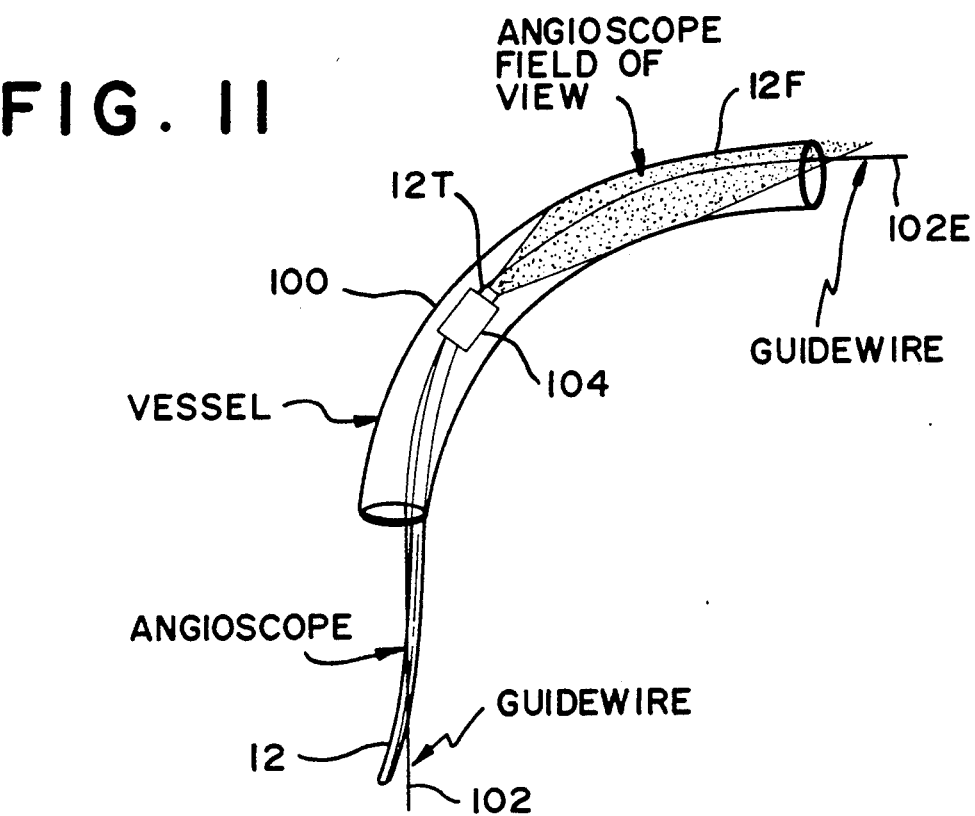
FIG. 11 shows a simplified side view of guide wire use according to the present invention.

With reference to FIG. 11, a guidewire technique will be discussed. As shown in the simplified side view of FIG. 11, a guidewire 102 has been inserted into the vessel 100 of a patient. The guidewire may be of a known steerable type as often used with various catheters in connection with medical procedures. The tip 12T of the angioscope 12 is spaced from the end 102E such that the angioscope has the indicated field of view 12F. The tip 12T is coupled to the guidewire 102 in a fashion described below and such that the guidewire stabilizes the tip of the angioscope and orients it for a better view or image than would otherwise be the case.

In using the angioscope 12, the guidewire 102 would initially be inserted into the vessel 100. The angioscope 12 (only partially shown in FIG. 11) would be coupled to a catheter 104 in known fashion. For example, the catheter 104 (only a small portion of which is shown in FIG. 11) would have a passage extending through it so that the angioscope would extend through the catheter. The catheter 104 would be used for flushing the vessel 100 with saline or other liquid so as to remove the blood from the angioscope's field of view. After the catheter 104 and angioscope 12 are coupled together, they may be slid along the guidewire 102 until they reach the desired location. One might alternately insert the guidewire 102 and the angioscope 12 and catheter 104 together into the vessel 100 with a separation distance being provided between the tip 12T and the end 102E. The catheter 104 would be coupled to the guidewire 102 by having the guidewire 102 run through the hole (not separately shown in FIG. 11) in the catheter 104. The tip 12T would in turn be coupled to the wire 102 by virtue of the angioscope 12 and the guidewire 102 running through the same hole in the catheter 104. Alternately, the catheter 104 could include separate holes for the angioscope 12 and the guidewire 102 in which case the tip 12T would be coupled to the guidewire 102 by way of the separate holes and the structure of the catheter 104. Alternately, the angioscope 12 could be coupled to the guidewire by virtue of a hole in the angioscope (not shown) or a tube mounted on the side of the angioscope (not shown).

The guidewire 102 serves to stabilize the tip 12T. That is, it tends to maintain the tip 12T in a more stable position than would otherwise be the case. Additionally, and significantly, the guidewire 102 better orients the tip 12T so as to provide a better field of view 12F than would otherwise be the case. This may best be explained by considering what would happen if the guidewire 102 was not coupled to the tip 12T in the view of FIG. 11. The tendency of the angioscope 12 (as well as catheter 104) would be to extend in a straight line. Therefore, even though the angioscope 12 is flexible, its tip 12T would be directly abutting the wall of vessel 100. Depending upon the conditions, the view from the angioscope might be significantly impaired or restricted. Therefore, the guidewire 102 serves as a rail or track to space the tip 12T somewhat from the walls of vessel 100 and to orient the tip generally in the direction in which the vessel is curved by virtue of the portion of guidewire 102 which extends beyond the tip 12T and up to the end 102E.

Figure 12:
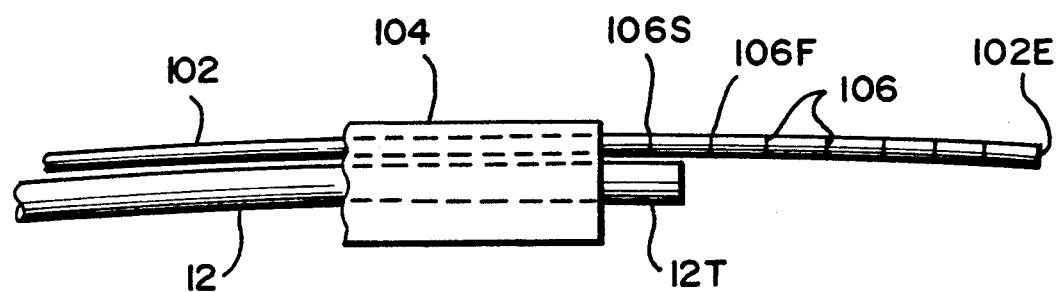
FIG. 12 shows an enlarged view of a portion of FIG. 11.

FIG. 12 shows an enlarged view of a portion of FIG. 11 with the vessel 100 and portions of the angioscope 12, guidewire 102, and catheter 104 deleted for ease of illustration. In addition to stabilizing and orienting the tip of the angioscope 12T, the guidewire 102 serves to improve the accuracy of the measurement process by virtue of the indicia or markings 106 disposed adjacent the distal end 102E (i.e., the end of steerable guidewire 102 which extends furthest into the patient).

Recalling the three step process for making measurements wherein the tip 12T of the scope 12 is placed at three different locations (or the simpler version wherein the tip 12T is placed at two different locations) that technique requires knowledge of the amount of change in position of the tip 12T in order to perform the necessary calculations. A simple way to obtain knowledge of the amount of change in position of 12T would be to move the portion of the scope 12 opposite the tip 12T and assume that the tip 12T had moved the same amount. However, considering that the scope 12 is flexible and would normally extend in a vessel larger than the external boundaries of the scope 12, such a procedure would introduce some inaccuracies in the measurements. The markings or calibrated indicia 106 provide a more precise way of determining the change in position of the tip 12T. (The indicia could be painted stripes or notches and could include numerals similar to a ruler.) For example, if the indicia were spaced apart one millimeter, and a first indicia 106F was at a particular position in the image, the angioscope 12 could be moved back away from the end 102E until the indicia 106S is at the same location in the view of the angioscope such that the tip 12T can be said to have moved one millimeter corresponding to the separation distance between marking 106F and marking 106S. The accuracy of this technique of moving the tip 12T a set distance corresponding to the separation distance between indicia might be slightly improved by including a piece of tubing (not shown) at the immediate end of the tip 12T, the tubing having the guidewire 102 passing therethrough. Such a piece of tubing would ensure that the guidewire 102 is directly coupled at the absolute end of tip 12T to the angioscope 12, instead of simply coupled to the guidewire 102 by way of the passage of guidewire 102 and scope 12 through a common hole or separate holes in the catheter 104. However, an even more precise measurement technique which also is not limited to movement of the tip 12T in discrete amounts will be discussed below.

Assuming that the tip 12T is in the first position for one of the multiple step measurement techniques (i.e., one of the techniques discussed above wherein the tip 12T is placed at two or three different positions), one can measure the distance in pixels between two of the indicia. Additionally, after the tip 12T is moved to a second position, one can measure in pixels the distance between the same two indicia. One would then use that distance in performing the multiple step measurement process in the manner discussed above.

The major complication of this approach lies in the fact that the magnification of the angioscopic image is decreasing as the object recedes from the scope tip; there exists a gradient of magnification between the two indicia or tick marks. However starting from the knowledge that the distance between any two tick marks is fixed, if those two tick marks are identified in two frames, then the distance that the angioscope moved between those two frames may be determined.

This distance between tick marks or indicia approach would require projecting the distance between the two ticks into a plane perpendicular to the angioscope tip. Change in angioscope location could then be determined by analyzing the change in this projected distance in an approach analogous to that for analyzing the change in the width of a tick mark (which simpler approach is discussed below).

The alternate approach uses the width of the tick marks or line marks 106 to determine the change in position. Given that the diameter of the guidewire is some fixed value, then the width of the tick marks on the guidewire will correspond to that diameter value. As the angioscope recedes from a given tick mark on the guidewire, that tick mark will appear to grow smaller. With a prior knowledge of the width of the tick marks, the distance from the angioscope tip to a given tick mark may be determined at each of any number of locations, given the width of the tick mark in pixels in the digitized image.

This operation amounts to determining the number of pixels per millimeter in the angioscopic scene at the tick mark, and then determining the distance that the angioscope must be from the tick mark to display that magnification. A reasonable simplification would assume that the tick mark is approximately perpendicular to the angioscope tip. Distance from angioscope to tick mark could be determined iteratively from the previously discussed scope equation, or from an alternative equation of a form:

$$Z = G(P) \cdot I(D)$$

Where:
Z—Axial distance from angioscope tip to object
P—Pixels size of the object
D—Actual size of the object (i.e., known width of wire)
G(P)—A function of P
I(D)—A function of D The coefficients for the two previous functions of the pixel size, P and the object size, D may be calculated during the curve fitting procedure which has been discussed for the previous scope equation. In other words, one may calculate coefficients for forms of G and I through a calibration and curve fitting technique as with F and H above. This new equation stems from the same data set that the previous equation relies upon, but the curve fit is performed utilizing a different set of dependent and independent variables.

The determination of the area of an object lying in a plane perpendicular to the angioscope tip involves solving for two unknowns: the distance from angioscope to the feature plane and the area of the object under analysis. The determination of distance moved from changes in the image of a calibrated guidewire involves solving for only one unknown: the distance from angioscope to tick mark. This distance may be solved absolutely using the equation described above, or may be estimated using the scope equation and the Newton-Raphson algorithm.

Many improvements may be made to the techniques discussed above to improve their accuracy. The most elegant would amount to the operator roughly outlining the guidewire as it appears in each image, and then allowing the computer to very precisely determine the outline of the guidewire and the location of each visible tick mark. From this precise outline, then various angles with which the guidewire rests with regard to the angioscope may be estimated, and the collective changes in the locations and sizes of all of the tick marks may be used to estimate the distance which the angioscope has moved. This would be the optimal algorithm for the determination of scope movement, as operator error is all but eliminated. The computer model of how the guidewire should appear, and the effects of various angular orientations of the angioscope to the guidewire may be tuned until the maximal movement resolution is obtained. Additionally, the knowledge of the curvature of the vessel may be used to improve the estimation of the areas of objects which do not lie on a feature plane perpendicular to the angioscope tip. The angle of the feature plane may be estimated from a knowledge of the angle of the vascular wall with respect to the angioscope. This would be typical of any object which lies on the vascular wall parallel to the angioscope, as is the case with a side branch or perforation of the vessel.

A major benefit of the calibrated guidewire when used with a quantitative angioscopy system lies in the fact that the guidewire provides a set of known features in the angioscopic image which may be propagated to the rest of the image. A critical analysis of the guidewire image will provide a complete description of the angioscope movement. This absolute knowledge is not available if some feature of known size does not appear in the angioscopic image.

Newton-Raphson Approximation

A brief discussion of Newton-Raphson approximation may be helpful herein, although the present invention could use other approximation purposes in connection with the above techniques.

The purpose of the Newton-Raphson approximation technique is to locate the approximate location of the roots or local minima in a given function. If the function is smooth and contains only one global minimum, this single minimum will be located.

The approximation uses an iterative technique to locate the minimum and may be "tuned" to get as close to the actual minimum value as desired.

Figure 13:
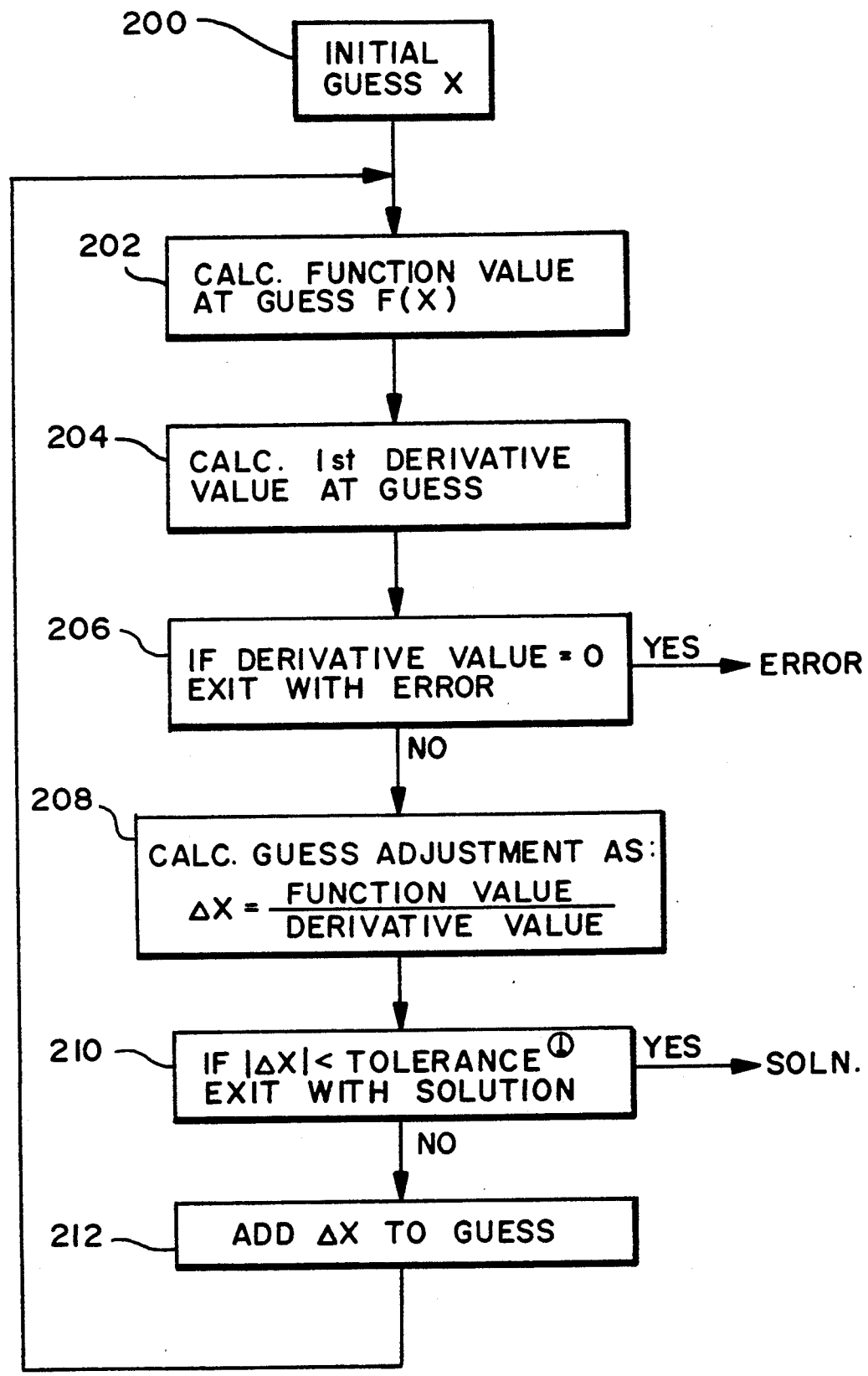
FIG. 13 shows a flow diagram of an approximation technique which may be used with the present invention.

With reference now to FIG. 13, a classic Newton-Raphson approximation technique is shown. At block 200, a guess is made as to the value of the minimum. Control passes to block 202 which calculates the function value at the guess. In this case, the function is F, an arbitrary function of X. At block 204, the first derivative value at the initial guess is calculated. This may be approximated by calculating the value of the function A small value above X and subtracting the value of the function at the same small value below X and dividing by 2 times the small value. If the derivative value is equal to 0, block 206 indicates an error. If the first derivative value is not equal to 0, block 208 calculates an adjustment level which is dependent upon the function value and the derivative value. If the guess adjustment is smaller than a tolerance, block 210 outputs the solution which is an indication that the particular value of X is within the tolerance of the minimum value. If block 210 indicates that the adjustment is not within the tolerance, block 212 increments the guess and returns control to block 202 wherein the process is repeated. Ultimately, the minimum value of the function is determined.

Figure 14:
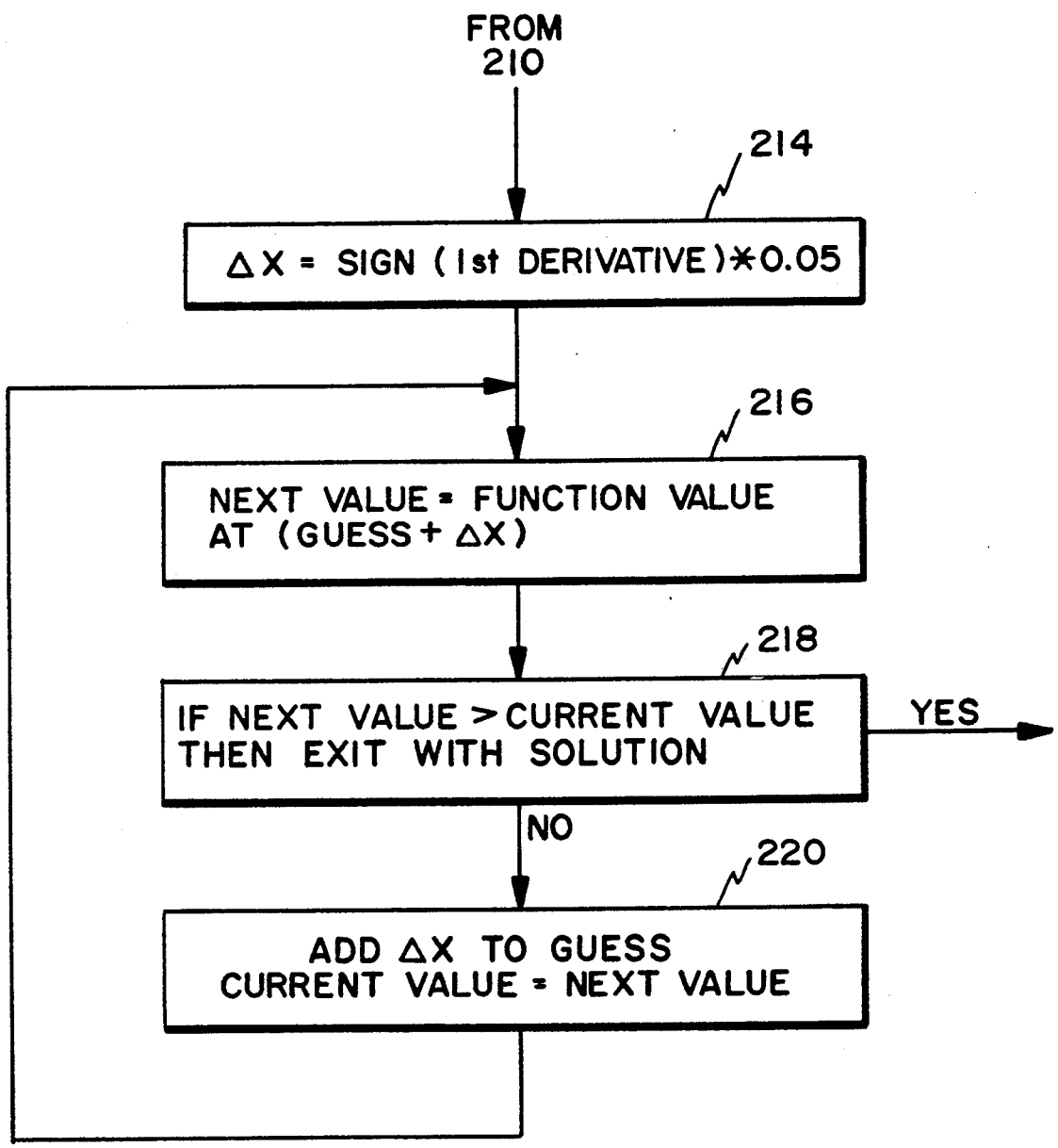
FIG. 14 shows a flow diagram of a technique used in conjunction with the FIG. 13 technique to provide more accurate information.

The tolerance value may initially be a fairly large number due to errors introduced by the approximation of the first derivative. However, one may approximate the minimum value more accurately by using an iterative technique with fixed distance to narrow down the minimum as shown by the flow diagram of FIG. 14. In particular, block 214 would receive control from block 210 in FIG. 13 and would redefine the change in the guess adjustment. Block 216 then defines a next value as the function value at the guess output by block 210 changed by an amount equal to the guess adjustment value. At block 218 a test is performed to determine if the next value is greater than the current value (which current value is the value of X as determined by FIG. 13). If the next value is greater than the current value, this indicates that the current value is the minimum and the block 218 supplies the solution. If block 218 fails to provide the solution, control is transferred to block 220 which increments the guess by the adjustment value and which redefines the current value as the next value. Control then transfers back to block 216 which repeats the process until block 218 indicates that the current value of the function at the guess is less than the next value of the function, whereupon the solution is supplied.

If desired, one could alternately calculate the actual derivative instead of using the approximation indicated above.

Although the present invention has been described with reference to particular designs and techniques, it is to be understood that these are for illustrative purposes only. Various modifications and adaptations will be apparent to those of skill in the art. For example, another degree of freedom might be added to the scope equation for the monoscopic scope. Measurement of volumes might be accomplished from analysis of a series of pictures taken at different Z - axis locations. Accordingly, the scope of the present invention should be determined by reference to the claims appended hereto.

What is claimed is:

1. A system for angioscopic dimensional analysis comprising:
    an optical fiber angioscope having a tip for insertion into the interior of a vessel;
    a video camera connected to said angioscope;
    a monitor to display images of the interior of a vessel from the tip of the angioscope; and
    a computer connected to process data from said video camera, said computer having storage means with stored coefficients for conversion of pixels into dimensional units for feature planes at any distance within an operational range of said tip; and
    wherein said computer includes input means to receive data representative of the number of pixels corresponding to an unknown dimensional feature of an angioscopic image and processing means to quantify the dimensional feature by use of at least one appropriate coefficient to convert from pixels to dimensional units and by taking into account an actual distance, within said operational range, between said tip and the dimensional feature.

2. The system of claim 1 further comprising a guidewire for guiding the angioscope.

3. A system for angioscopic dimensional analysis comprising:
    an optical fiber angioscope having a tip;
    a video camera connected to said angioscope;
    a monitor to display images from the angioscope; and
    a computer connected to process data from said video camera, said computer having storage means with stored coefficients for conversion of pixels into dimensional units for feature planes at different distances from said tip; and
    wherein said computer includes input means to receive data representative of the number of pixels corresponding to an unknown dimensional feature of an angioscopic image and processing means to quantify the dimensional feature by use of at least one appropriate coefficient to convert from pixels to dimensional units; and further comprising a guidewire for guiding the angioscope; and wherein said guidewire has indicia marked thereon and separated by known distances for viewing by way of the angioscope, and wherein said input means to receive is operable to receive data representative of the number of pixels corresponding to an unknown dimensional feature of an angioscopic image with the tip positioned at a plurality of distances from a feature plane; and said processing means is operable to determine the distance from said tip to the feature plane based on changes in the data corresponding to moving the position of the tip an unknown amount, quantify this unknown amount of movement from changes in the image of the guidewire by use of at least one appropriate coefficient to convert from pixels to dimensional units, and quantify the dimensional feature by use of at least one appropriate coefficient to convert from pixels to dimensional units; and said guidewire is operable to stabilize the angioscope and/or orient the angioscope such that the method of angioscopy is improved.

4. A system for angioscopic dimensional analysis comprising:

an optical fiber angioscope having a tip;
a video camera connected to said angioscope;
a monitor to display images from the angioscope; and
a computer connected to process data from said video camera, said computer having storage means with stored coefficients for conversion of pixels into dimensional units for feature planes at different distances from said tip; and wherein said computer includes input means to receive data representative of the number of pixels corresponding to an unknown dimensional feature of an angioscopic image and processing means to quantify the dimensional feature by use of at least one appropriate coefficient to convert from pixels to dimensional units; and wherein said input means is operable to receive data representative of the number of pixels corresponding to an unknown dimensional feature of an angioscopic image with the tip positioned at a plurality of distances from a feature plane, and said processing means is operable to determine the distance from said tip to the feature plane based on changes in the data corresponding to moving the position of the tip an amount, and quantify the dimensional feature by use of at least one appropriate coefficient to convert from pixels to dimensional units.

5. The system of claim 4 wherein said processing means is operable to determine the distance from said tip to the feature plane by converting said unknown dimensional feature from pixels into dimensional units A1 when the feature plane is at a first unknown distance from said tip based upon a first hypothesized distance from the feature plane to said tip, converting said unknown dimensional feature from pixels into dimensional units A2 when the feature plane is at a second unknown distance from said tip based upon a second hypothesized distance from the feature plane to said tip, said second unknown distance being a known offset from said first unknown distance, and trying different values for said first and second hypothesized distances to yield different values for A1 and A2 by repetitive conversions until A1 and A2 are determined to be sufficiently close that& the hypothesized distances are accurate, and wherein the dimensional feature is quantified from A1 and/or A2.

6. The system of claim 5, wherein said processing means is operable to convert said unknown dimensional feature from pixels into dimensional units A3 when the feature plane is at a third unknown distance from said tip based upon a third hypothesized distance from the feature plane to the tip, said third unknown distance being a known offset from said first unknown distance and/or a known offset from said second unknown distance, and to try different values for said first, second, and third hypothesized distances to yield different values for A1, A2, and A3 by repetitive conversions until A1, A2, and A3 are determined to be sufficiently close that the hypothesized distances are accurate, and wherein the dimensional feature is quantified from A1, A2, and/or A3.

7. The system of claim 6 wherein the processing means is operable to select accurate distances by determining the hypothesized distances which provide the minimal differences in values for A1, A2, and A3.

8. A method of measuring angioscopic dimensional features using an angioscopic dimensional analysis system having:

an angioscope having a tip and two image-guiding fiber optic bundles spaced apart for providing a stereoscopic image by combining two images, one from each of said fiber optic bundles;
a video camera connected to said angioscope;
a monitor to display images from the angioscope; and
a computer connected to process data from said video camera, said computer having stored coefficients for conversion of pixels into dimensional units for feature planes at different distances from said tip;

the steps comprising:

having the computer receive data representative of the number of pixels corresponding to an unknown dimensional feature of an angioscopic image, the dimensional feature being at an unknown distance within an operational range from said tip;
determining the distance from said tip to the dimensional feature by use of difference in images supplied by the two fiber optic bundles; and
quantifying the dimensional feature by use of at least one appropriate coefficient to convert from pixels to dimensional units.

9. A method of measuring angioscopic dimensional features using an angioscopic dimensional analysis system having:

an angioscopic having a tip;
a video camera connected to said angioscope;
a monitor to display images from the angioscope; and
a computer connected to process data from said video camera, said computer having stored coefficients for conversion of pixels into dimensional units for feature planes at different distances from said tip;

the steps comprising:

having the computer receive data representative of the number of pixels corresponding to an unknown dimensional feature of an angioscopic image; and
quantifying the dimensional feature by use of at least one appropriate coefficient to convert from pixels to dimensional units, and further comprising the step of determining the distance from the tip to the feature plane.

10. The method of claim 9 wherein the distance from the tip to the feature plane is determined by viewing indicia marked upon a guidewire extending beyond the tip.

11. A method of measuring angioscopic dimensional features using an angioscopic dimensional analysis system having:

an angioscope having a tip;
a video camera connected to said angioscope;
a motor to display images from the angioscope; and
a computer connected to process data from said video camera, said computer having stored coefficients for conversion of pixels into dimensional units for feature planes at different distances from said tip;

the steps comprising:
having the computer receive data representative of the number of pixels corresponding to an unknown dimensional feature of an angioscopic image; and
quantifying the dimensional feature by use of at least one appropriate coefficient to convert from pixels to dimensional units, and
wherein the computer receives data representative of the number of pixels corresponding to an unknown dimensional feature of an angioscope image with the tip positioned at a plurality of distances from a feature plane and further comprising the step of determining the distance from said tip to the feature plane based on changes in the data corresponding to moving the position of the tip an amount.

12. The method of claim 11 further comprising the steps of: converting said unknown dimensional feature from pixels into dimensional units A1 when the feature plane is at a first unknown distance from said tip based upon a first hypothesized distance from the feature plane to said tip, converting said unknown dimensional feature from pixels into dimensional units A2 when the feature plane is at a second unknown distance from said tip based upon a second hypothesized distance from the feature plane to said tip, said second unknown distance being a known offset from said first unknown distance, and
trying different values for said first and second hypothesized distances to yield different values for A1 and A2 by repetitive conversions until A1 and A2 are determined to be sufficiently close that the hypothesized distances are accurate, and wherein the dimensional feature is quantified from A1 and/or A2.

13. The method of claim 11 further comprising the steps of:
converting said unknown dimensional feature from pixels into dimensional units A1 when the feature plane is at a first unknown distance from said tip based upon a first hypothesized distance from the feature plane to said tip, converting said unknown dimensional feature from pixels into dimensional units A2 when the feature plane is at a second unknown distance from said tip based upon a second hypothesized distance from the feature plane to said tip, said second unknown distance being a known offset from said first unknown distance, converting said unknown dimensional feature from pixels into dimensional units A3 when the feature plane is at a third unknown distance from said tip based upon a third hypothesized distance from the feature plane to the tip, said third unknown distance being a known offset from said first unknown distance and/or a known offset from said second unknown distance, and trying different values for said first, second, and third hypothesized distances to yield different values for A1, A2, and A3 by repetitive conversions until A1, A2, and A3 are determined to be sufficiently close that the hypothesized distances are accurate, and wherein the dimensional feature is quantified from A1, A2, and/or A3.

14. The method of claim 13 further comprising having the computer select accurate distances by determining the hypothesized distances which provide the minimal difference in values for A1, A2, and A3.

15. A method for use with an angioscopic dimensional analysis system having:
an angioscope having a tip;
a video camera connected to said angioscope;
a monitor to display images from the angioscope; and
a computer connected to process data from said video camera;
the steps comprising calibrating the system by:
placing at least one known pattern at a series of known distances from the tip of the angioscope such that the video camera generates a corresponding series of images composed of pixels;
measuring the number of pixels in a dimensional feature of the pattern having known dimensions for each image; having the computer calculate at least one coefficient for each known distance, each coefficient useful for conversion of pixels to dimensional units; and storing each of the coefficients.

16. The method of claim 15 wherein said placing step includes the placing of several known patterns at the series of known distances.

17. The method of claim 16 wherein each of said images is a circle.

18. The method of claim 17 wherein a plurality of coefficients are calculated and the calculation of the coefficients includes curve fitting to determine the relationship between the known dimensions, the pixels in dimensional features, and the known distances.

19. The method of claim 15 wherein a plurality of coefficients are calculated and the calculation of the coefficients includes curve fitting to determine the relationship between the known dimensions, the pixels in dimensional features, and the known distances.

20. The method of claim 15 further comprising measuring angioscopic dimensional features with the system by the steps of:
having the computer receive data representative of the number of pixels corresponding to an unknown dimensional feature of an angioscopic image with the tip positioned at a plurality of distances from a feature plane;
determining the distance from said tip to the feature plane based on changes in the data corresponding to moving the position of the tip a known amount; and quantifying the dimensional feature by use of at least one appropriate coefficient to convert from pixels to dimensional units.

21. The method of claim 20 further comprising the steps of;
converting said unknown dimensional feature from pixels into dimensional units A1 when the feature plane is at a first unknown distance from said tip based upon a first hypothesized distance from the feature plane to said tip, converting said unknown dimensional feature from pixels into dimensional units A2 when the feature plane is at a second unknown distance from said tip based upon a second hypothesized distance from the feature plane to said tip, said second unknown distance being a known offset from said first unknown distance, and trying different values for said first and second hypothesized distances to yield different values for A1 and A2 by repetitive conversions until A1 and A2 are determined to be sufficiently close that the hypothesized distances are accurate, and wherein the dimensional feature is quantified from A1 and/or A2.

22. The method of claim 20 further comprising the steps of:

converting said unknown dimensional feature from pixels into dimensional units A1 when the feature plane is at a first unknown distance from said tip based upon a first hypothesized distance from the feature plane to said tip, converting said unknown dimensional feature from pixels into dimensional units A2 when the feature plane is at a second unknown distance from said tip based upon a second hypothesized distance from the feature plane to said tip, said second unknown distance being a known offset from said first unknown distance, converting said unknown dimensional feature from pixels into dimensional units A3 when the feature plane is at a third unknown distance from said tip based upon a third hypothesized distance from the feature plane to the tip, said third unknown distance being a known offset from said first unknown distance and/or a known offset from said second unknown distance, and trying different values for said first, second, and third hypothesized distances to yield different values for A1, A2, and A3 by repetitive conversions until A1, A2, and A3 are determined to be sufficiently close that the hypothesized distances are accurate, and wherein the dimensional feature is quantified from A1, A2, and/or A3.

23. The method of claim 22 further comprising selecting accurate hypothesized distances by determining the distances which provide the minimal differences in values for A1, A2, and A3.

24. The method of claim 15 wherein the angioscope includes two image guiding fiber optic bundles spaced apart for providing a stereoscopic image by combining two images, one from each of said fiber optic bundles, and wherein the system is calibrated by performing the placing, measuring, having the computer calculate, and storing steps for each of the fiber optic bundles.

25. A method of obtaining an image from a vessel in a patient by an angioscope, the steps comprising:
 inserting a guidewire having an end into the vessel;
 inserting the angioscope into the vessel with the angioscope having a tip which is coupled to the guidewire; and
 maintaining the tip of the angioscope spaced from the end of the guidewire such that the angioscope is oriented to provide a desired image, and
further comprising the step of determining a distance relative to the tip of the angioscope by viewing indicia on said guidewire.

26. The method of claim 25 wherein a video camera is connected to said angioscope; a monitor is connected to the video camera to display images from the angioscope; and a computer connected to process data from said video camera, said computer having stored coefficients for conversion of pixels into dimensional units for feature planes at different distances from said tip; the steps further comprising;
 having the computer receive date representative of the number of pixels corresponding to an unknown dimensional feature of an angioscopic image with the tip positioned at a plurality of distances from a feature plane;
 determining the distance from said tip to the feature plane based on changes in the data corresponding to moving the position of the tip an unknown amount;
 quantifying this unknown amount of movement from changes in the image of the guidewire by use of at least one appropriate coefficient to covert from pixels to dimensional units; and
 quantifying the dimensional feature by use of at least one appropriate coefficient to covert from pixels to dimensional units.

* * * * *

UNITED STATES PATENT AND TRADEMARK OFFICE
CERTIFICATE OF CORRECTION

PATENT NO. : 5,036,463
DATED : July 30, 1991
INVENTOR(S) : George S. ABELA, ET AL It is certified that error appears in the above-identified patent and that said Letters Patent is hereby corrected as shown below:

Column 19, line 56:
Claim 5, line 16:   delete "that&" and insert -- that --

Column 20, line 39:
Claim 9, line 4:    delete "angioscopic" and insert -- angioscope --

Column 20, line 64:
Claim 11, line 6:   delete "motor" and insert -- monitor --

Signed and Sealed this

Twentieth Day of October, 1992

Attest:

DOUGLAS B. COMER

*Attesting Officer*    *Acting Commissioner of Patents and Trademarks*